(12) United States Patent
Guldimann

(10) Patent No.: US 9,448,104 B2
(45) Date of Patent: Sep. 20, 2016

(54) IMAGING OPTICS AND OPTICAL DEVICE FOR MAPPING A CURVED IMAGE FIELD

(75) Inventor: Benedikt Guldimann, Noordwijk (NL)

(73) Assignee: European Space Agency, Paris (FR)

( * ) Notice: Subject to any disclaimer, the term of this patent is extended or adjusted under 35 U.S.C. 154(b) by 441 days.

(21) Appl. No.: 13/811,656

(22) PCT Filed: Jul. 19, 2011

(86) PCT No.: PCT/EP2011/062362
§ 371 (c)(1),
(2), (4) Date: May 31, 2013

(87) PCT Pub. No.: WO2012/010601
PCT Pub. Date: Jan. 26, 2012

(65) Prior Publication Data
US 2013/0234009 A1 Sep. 12, 2013

(30) Foreign Application Priority Data
Jul. 19, 2010 (EP) .................................. 10170040

(51) Int. Cl.
*G02B 6/06* (2006.01)
*G01J 1/04* (2006.01)
(Continued)

(52) U.S. Cl.
CPC ............... *G01J 1/0425* (2013.01); *G01J 3/02* (2013.01); *G01J 3/0216* (2013.01); *G01J 3/0262* (2013.01); *G02B 6/10* (2013.01); *G02B 27/0025* (2013.01); *G02B 3/0056* (2013.01); *G02B 6/08* (2013.01)

(58) Field of Classification Search
CPC .... G01J 3/0216; G01J 3/0262; G01J 1/0407; G01J 1/0425
USPC .............................................. 250/216, 227.2
See application file for complete search history.

(56) References Cited

U.S. PATENT DOCUMENTS 6,490,801 B1 * 12/2002 Hersom et al. ................. 33/268
6,849,843 B2 2/2005 Ansorge
(Continued)

FOREIGN PATENT DOCUMENTS

EP 1 122 791 B1 8/2007
WO 2004/070438 A1 8/2004
WO 2005/050558 A2 6/2005

OTHER PUBLICATIONS

European Examination Report dated Mar. 14, 2014, in European Application No. 10 170 040.9, filed Jul. 19, 2010, 5 pages.
(Continued)

*Primary Examiner* — Thanh Luu
(74) *Attorney, Agent, or Firm* — Christensen O'Connor Johnson Kindness PLLC

(57) ABSTRACT

The present invention relates to optical devices for imaging and spectroscopic applications where optical field curvature is a predominant characteristic. In particular, the invention relates to imaging optics and an optical device for mapping a curved image field. The optical device for mapping a curved image field comprises a focal plane array 20 having a plurality of light processing elements 21 and a focal plane adapter 110 mounted in front of the focal plane array 20 configured to transmit the curved image field to the light processing elements 21 of the focal plane array 20. The focal plane adapter 110 comprises a plurality of waveguides 111 wherein first ends of the waveguides 111 facing the incident curved image field are arranged on a curved surface 12, the curved surface 12 being adapted to a profile of an optical field curvature of the curved image field so that the plurality of waveguides 111 divide the curved image field along a curved focal plane of the image field into a plurality of image segments. The second ends of the waveguides 111 are allocated to the light processing elements 21 to map the plurality of image segments onto the allocated light processing elements 21.

11 Claims, 4 Drawing Sheets

(51) Int. Cl.
*G01J 3/02* (2006.01)
*G02B 6/10* (2006.01)
*G02B 27/00* (2006.01)
*G02B 3/00* (2006.01)
*G02B 6/08* (2006.01)

(56) References Cited

U.S. PATENT DOCUMENTS

| | | | |
|---|---|---|---|
| 7,236,560 B2* | 6/2007 | Malamud | 378/7 |
| 7,587,109 B1* | 9/2009 | Reininger | 385/116 |
| 2005/0052751 A1 | 3/2005 | Liu | |
| 2006/0056040 A1 | 3/2006 | Lan | |
| 2009/0127439 A1 | 5/2009 | Choi | |
| 2010/0100322 A1* | 4/2010 | Leijtens | 701/222 |
| 2010/0200736 A1* | 8/2010 | Laycock | G02B 6/06 |
| | | | 250/227.2 |

OTHER PUBLICATIONS

Rim, S.-B., et al., "The Optical Advantages of Curved Focal Plane Arrays," Optics Express 16(7):4965-4971, Mar. 31, 2008.

Swain, P. K, et al. "Curved CCDs and Their Application With Astronomical Telescopes and Stereo Panoramic Cameras," Proceedings of SPIE, San Jose, Calif., Jun. 7, 2004, vol. 5301, pp. 109-129.

International Search Report mailed Nov. 3, 2011, in International Patent Application No. PCT/EP2011/062362, filed Jul. 19, 2011, 3 pages.

European Search Report dated Jan. 17, 2011, in European Patent Application No. 10170040.9, filed Jul. 19, 2010, 6 pages.

\* cited by examiner

IMAGING OPTICS AND OPTICAL DEVICE FOR MAPPING A CURVED IMAGE FIELD

The present invention relates to optical components for imaging and spectroscopic applications where optical field curvature is a predominant characteristic. In particular, the invention relates to imaging optics and an optical device for mapping a curved image field.

A particular, but non-exhaustive, application of the invention lies in space missions where optical field curvature is a predominant characteristic. Optical instruments such as telescopes, spectral imaging devices or dispersive spectrometers as often used for space missions have a non planar image field and thus, curved focal plane. Thus, an object is imaged or projected on a curved surface in the image space rather than on a plane due to the optical field curvature. This means that on certain areas in the image plane the local focal length differs from the nominal focal length, the nominal focal length usually being the paraxial focal length. If a curved image field is mapped directly onto a planar focal plane array, the effect of the optical field curvature causes a degradation of the image resolution and image quality of an imaging system or a degradation of the spectral resolution of a dispersive spectrometer.

A proposed solution in the prior art is to correct for the effect of such a local defocus using compensating optical elements, e.g. a combination of lenses, to "flatten" the curved image field before it is being mapped onto a planar focal plane array (FPA). In general, such optical field correctors consist of corrective lens assemblies that can typically effect a correction of the image plane only in a limited region over the field of view. Moreover, the need for additional field correctors complicates the optical system design and results in higher cost. For example, US 2005/0052751 discloses a microlens array on a curved surface to change the beam curvature to adjust a flat FPA to a curved incoming field. This proposed solution suffers from high weight and volume and is difficult and costly to design and manufacture since the focal length of the microlenses is varying over the array. The proposed microlens array also reduces the throughput since a significant part of the light incident on the curved array is not transmitted via the micro-lenses to the FPA.

Instead of using corrective lenses in combination with a planar FPA, another approach proposed in the prior art is to fabricate curved FPAs, e.g., by mounting the detectors individually on a curved substrate (mosaicing), as proposed in EP 1122791 B1, which results in a large focal plane array since an individually produced detector including its package is much larger than a detector pixel in a detector array. Another approach is to fabricate detector arrays on a curved surface or to fabricate detector arrays onto a very thin and flexible surface, cf. e.g. Rim et al. (The optical advantages of curved focal plane arrays), Vol. 16, No. 7, Optics Express 4965, 31 Mar. 2008 and Swain et al. (Curved CCD's and Their Applications with Astronomical Telescopes and Stereo Panoramic Cameras), Proc. Of SPIE-IS&T Electronic Imaging, SPIE Vol. 5301, 2004. However, there are no practical, low-cost techniques to realize such curved FPAs. Furthermore, such mosaiced focal planes are mainly applicable to very large telescopes and are either very expensive and/or have lower performances than solutions based on mass produced conventional detector technology which requires a planar design of the FPA.

In view of the above problems of the prior art, it is therefore an object of the invention to provide a more compact, simpler and lower-cost optical device to map a curved image field and to reduce the effects of the optical aberrations resulting from the optical field curvature.

This object is accomplished by the subject-matter according to the optical device of claim 1. The dependent claims refer to preferred embodiments of the invention.

An optical device for mapping a curved image field, thus an optical device for use in imaging optics for a non planar image field is proposed. In particular, an optical device that guides a curved image field and reduces the effects of optical field curvature of the curved image field is proposed.

According to an aspect of the invention, the optical device comprises a focal plane array (FPA) having a plurality of light processing elements and a focal plane adapter mounted in front of the FPA and configured to transmit the curved image field to the light processing elements of the FPA.

An FPA is an image sensing or image processing device consisting of an optical array function volume, i.e., an array, typically rectangular, of light processing elements. An FPA is typically placed at or near a focal plane of the imaging optics. The term "FPA" can refer to a variety of imaging device types that are sensitive in the visible and/or non-visible spectrum. FPAs can be used for imaging purposes (e.g. taking pictures or video imagery), but can also be used for non-imaging purposes such as spectrometry, LIDAR, and wave-front sensing. The terms "image", "image field" or "FPA" is to be understood in the context of this invention as to also include such "non-imaging" purposes and FPAs, e.g. curved image fields detected with spectrometers.

According to an aspect of the invention, the FPA may contain a photo-detector array or a microlens array or a liquid crystal array, filters or bolometer array or other means with an optical array function volume. According to another aspect of the invention, the FPA may comprise a CCD or CMOS detector array. According to an aspect of the invention, the FPA may be a planar focal plane array so that a mass-produced focal plane array can be used.

According to a further aspect of the invention, the focal plane adapter comprises a plurality of waveguides, wherein first ends of the waveguides facing the incident curved image field are arranged on a curved surface, the curved surface being adapted to a contour or profile of an optical field curvature of the curved image field so that the plurality of waveguides divide the curved image field along a curved focal plane of the image field into a plurality of image segments. In other words, the first ends of the waveguides, i.e., the front side of the hollow waveguide array at the side of the incident light, may be curved so that the focal plane adapter is configured to work as a focal plane sampling element that "pixilates" the curved optical field along the curved focal plane before it reaches the focal plane array to improve the image quality. Thus, the focal plane adapter may have a curved front surface. By way of example, this curvature may correspond to the curvature that would have otherwise been used for the curvature of a curved FPA, e.g. curved CCDs as known from the prior art. This front surface may be concave. The focal plane adapter with a curved front side serves as a focal plane pixilation element capable of guiding the incident light to a predetermined element or a plurality of predetermined elements of the planar focal plane array, thereby reducing the effects of field curvature. The image segments can also be understood as the image "pixels" of the image field that are guided to or mapped onto the array elements of the FPA. Each waveguide has a first end at the side of the incident light, and a second end adjacent to the FPA.

According to a further aspect of the invention, the second ends of the waveguides are allocated to the light processing elements of the FPA to map the plurality of image segments onto the allocated light processing elements. In other words, the focal plane adapter array is aligned with respect to the FPA by aligning the grid structure of the focal plane adapter to the grid or array structure of the FPA so that one waveguide/grid element of the focal plane adapter may transmit light to one or several predetermined array elements of the FPA. Thus, each waveguide may guide the incident light to a predetermined area of the FPA. The focal plane adapter compensates differing curvatures of the image field and of the FPA by establishing a relationship with an image segment of the curved image plane and the one or several corresponding array element(s) of the FPA to which this image segment is mapped by means of the focal plane adapter, thereby reducing the effect of field curvature on the local defocus or image resolution.

According to a further aspect of the invention, the curved front surface may be an elliptical paraboloid, or preferably the curved front surface may be a circular paraboloid to adapt the shape of the focal plane adapter front surface to the contour of the optical field curvature of the incident image field.

According to a further aspect of the invention, the fill factor of the focal plane adapter may be substantially the same as the fill factor of the focal plane array.

According to a further aspect of the invention, the image segments of the curved image plane may be mapped onto the allocated light processing elements using specular reflection or total internal reflection, only. The focal plane adapter may be an optical waveguide array working on the principle of total internal reflection that doesn't require any optical power, and hence doesn't need optical functionalities of lenses for instance to map a curved image field with a different curvature or by focusing onto a planar FPA or to an FPA. Thus, the focal plane adapter may guide the incident light by means of reflection only, e.g. using waveguides. The focal plane adapter is thus capable of correcting for the effect of the local defocus of the nonplanar imaging field without additional functionality than guiding light through waveguides with constant cross section. The focal plane adapter avoids the need of optical functions with optical power (lenses for instance) in front of the FPA.

According to a further aspect of the invention, the focal plane adapter may be a hollow waveguide array which is a compact, simple, light-weight and low-cost optical component to reduce the effects of the optical aberrations resulting from the optical field curvature of a non-planar image field. As an example, the plurality of waveguides may have a depth in the range of hundreds of micrometers and comprising walls with a light reflective coating and a thickness of a few micrometers.

A hollow wave guide array in the context of this invention may also include a waveguide grid, i.e., a grid of reflectors with a curved front surface that pixilates the incident light so that the light entering a grid element of the reflector grid is transmitted to one or several corresponding "pixels" or light processing elements of the focal plane array. In other words, the focal plane adapter or the hollow waveguide array may take the form of a curved waveguide sheet or a wafer (e.g. a silicon wafer) with a grid structure that matches, matches partially or not at all, a grid structure of the adjacent grid structure of the FPA. According to a further aspect of the invention, the waveguide array may take the form of a curved plate and may be thought of as conduits that transmit electromagnetic energy from a first end of the waveguide to a second end of the waveguide.

According to a further aspect of the invention, the waveguide array may be a bundle of substantially parallel electromagnetic waveguides which are held together into a single assembly. Each waveguide may be fused, bonded or otherwise held rigidly to adjacent waveguides.

According to a further aspect of the invention the focal plane adapter may be a waveguide array wherein the waveguides are not hollow and wherein the distance between adjacent waveguides may be at least two wavelengths and wherein a front and/or back side of the waveguides may comprise an anti-reflective coating and the side walls of the waveguides may comprise a reflective coating.

According to another aspect of the invention, the focal plane adapter with a curved front surface wherein the optical waveguides may be embedded in a transparent material (or in air or a vacuum) with index of refraction lower than index of refraction of the waveguide, wherein the length of the optical waveguides may vary from the inner to the outer portions due to the curved front surface. The waveguides may be formed in straight lines or may be curved. The curvature of the waveguides may vary depending on the curvature of the curved front surface or on design needs of the focal plane adapter.

According to a further aspect of the invention, the hollow waveguides may have a square cross-section. However, the hollow waveguides may also have a non-square cross-section, such as for example, rectangular or hexagonal cross-sections and may also have varying geometries and dimensions throughout the array. Preferably, the waveguides have the same cross-section as the focal plane array elements.

Preferably, the second end of the hollow waveguide array, i.e., the end portions of the waveguides that are adjacent to the focal plane array, is planar. A planar shape of the second end is particular advantageous if a planar FPA is used. Other shapes of the second end are also possible.

According to a further aspect of the invention, the image processing elements of the focal plane array and the plurality of waveguides of the hollow waveguide array may be arranged in a two-dimensional array. According to a further aspect of the invention, these elements may also be arranged in a one-dimensional array. A one-dimensional array may be preferably used if the optical system/instrument including the invention is a spectrometer based on a dispersive element such as a grating for instance.

According to a further aspect of the invention, an isolation layer or a gap may be arranged between the hollow waveguide array and the focal plane array to protect the often very fragile hollow waveguide array from being damaged during mounting as well as to protect the sensitive FPA, e.g. detector array, from being damaged during mounting or from functional degradation during operation. The gap or isolation layer may also be required by the fact that neither the FPA nor the focal plane adaptor interface surface would have a perfectly matched or flat surface. The hollow waveguide array may also be electrically connected in order to control its voltage.

According to a further aspect, the hollow waveguide array may comprise a highly light-reflective coating to minimize the losses when guiding the light to the focal plane array. By way of example, the plurality of waveguides may have a depth of hundreds of micrometers and comprise walls with a thickness of only a few micrometers. The dimensions of the waveguide array are preferably chosen depending on the dimensions and array structure of the FPA.

The present invention is particularly suitable for use in an imaging optics or front optics of imaging devices adapted to a broad field of view, e.g. on-vehicle cameras for detecting obstacles or space telescopes. According to a further aspect of the invention, the optical device of the invention may also be used with a camera objective or, preferably, a wide-field camera objective.

From the above, it can be understood that the invention solves a very critical optical imaging performance problem of optical instruments based on detector arrays or other FPAs used to process light of a non planar image field. The present invention makes it possible to provide optical instruments such as cameras, telescopes, spectrometers of higher image performance but without any corresponding excessive increase in effort by reducing the complexity, volume and weight of the imaging optics. Combining an FPA that is preferably planar with a focal plane adapter of the invention reduces image degradation resulting from the effects of the optical field curvature and avoids the need for complicated optical elements to change the beam curvature in front of the FPA as well as the need for a curvature of the FPA itself, thereby enabling a simple, cost effective optical device with a high fill factor that effectively avoids the effects of the optical distortions when guiding light with a non-planar image field to the FPA.

It is a particular advantage of the invention that the focal plane adapter spatially samples the optical field at its best local focus, i.e. along the curved image plane and without cross-sensitivity, to reduce the typical effect of the non-planar optical field which is a wider image point, or which is a local defocus that may degrade the image resolution on the FPA. It is a further advantage that the invention further increases design options for imaging optics by providing the optical design engineer with a new degree of freedom or a variable design parameter. The invention thereby increases the performance of optical systems as well as helping to find easier the optimal solution since corrective lenses and mirrors as required in optical systems known from the prior art can be removed and replaced by a focal plane adapter, such as a thin waveguide grid, in front of the focal plane array, thereby saving mass and volume.

It should be clear that the invention is not restricted to space applications. The invention finds applications in numerous other fields. Optical devices according to this invention may also be used to increase the imaging performance of optical instruments, in particular of wide field cameras, as used for portable devices such as mobile phones, mobile platforms such as vehicles and air-crafts, in surveillance, robotic vision or industrial monitoring applications. The present invention allows to greatly simplifying the optical design by means of the focal plane adapter as described above. Spectrometers based on optical gratings also can benefit from this invention the spectral resolutions of which can be increased, e.g., without increasing their size, or adding a mirror or a lens.

The invention is explained below in an exemplary manner with reference to the accompanying drawings, wherein FIG. 1 illustrates a schematic perspective view of the optical device according to an embodiment of the invention;

Figure 1:
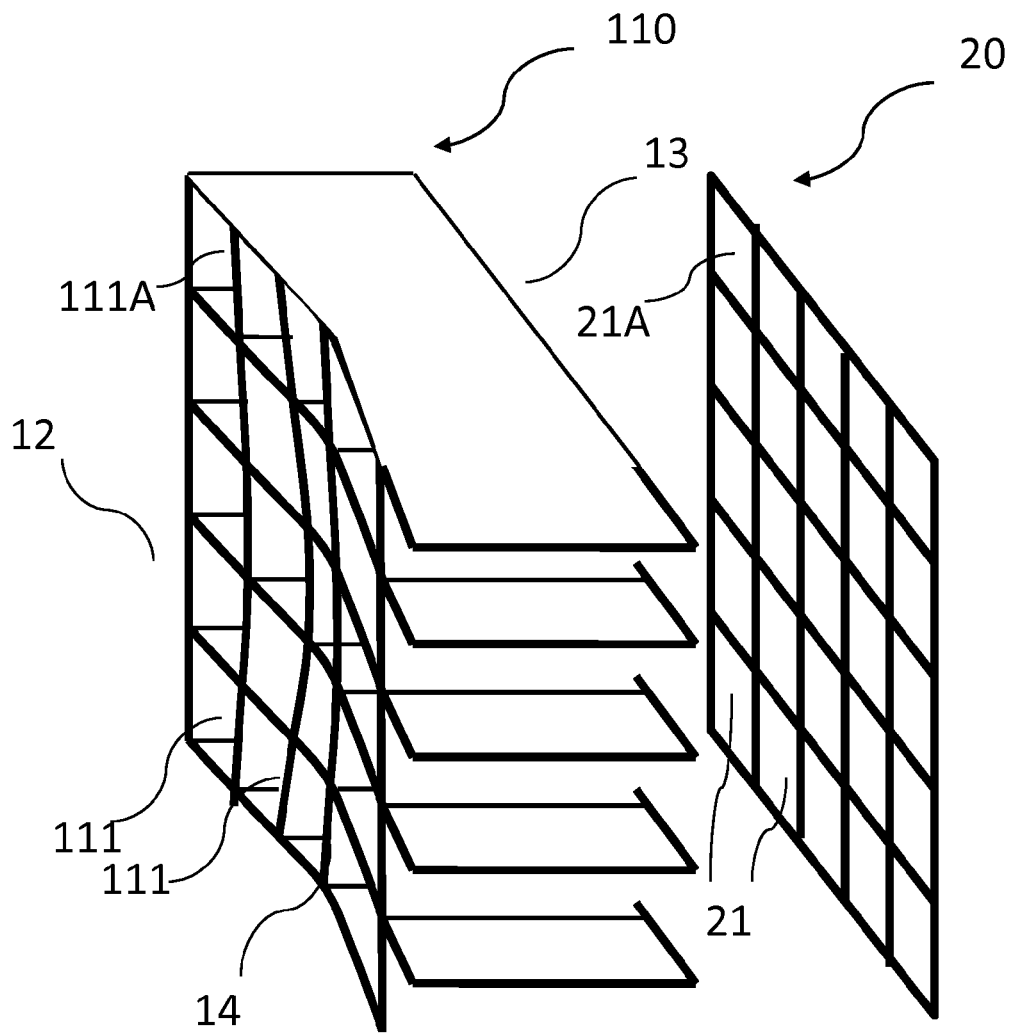

FIG. 1 shows schematically an optical device 1 according to an embodiment of the invention comprising a focal plane array 20 and a hollow waveguide array 110 mounted in front of the focal plane array 20. The focal plane array 20 is planar and comprises a plurality of light processing elements 21 arranged in a two-dimensional pattern. The light processing elements are for example detector pixels, if the focal plane array is a photo detector array. The hollow waveguide array 110 comprises a plurality of waveguides 111, each waveguide 111 corresponding to a light processing element 21 of the focal plane array 20 and transmitting incident light at a first end of the waveguide 111 to the corresponding light processing element 21 of the focal plane array. The first end, i.e., the front side 12, of the hollow waveguide array 110 is curved so that the first ends of the waveguides 111 lie on a curved focal surface. The curved focal surface 12 is adapted to a contour of an optical field curvature of the curved image field and is shaped as an elliptical paraboloid. The plurality of waveguides 111 divide or sample the curved image field along a curved focal plane of the image field into a plurality of image segments or "pixels" as determined by the grid structure of the hollow waveguide array.

The second ends of the waveguides 111 are located on top of the light processing elements 21 to map the plurality of image segments onto the allocated light processing elements 21. The back side of the focal plane adapter 13 is planar and adjacent to the FPA 20. The insides of the hollow waveguides 111 are reflective, i.e., represent a mirror in order to conduct incident light at the first end 12 to the second end 13 with minimized transmission losses.

The grid structures of the hollow wave guide array 110 and the grid structure of the focal plane array 20 are aligned, i.e., each waveguide 111 corresponds to a corresponding light processing element 21 of the focal plane array so that light exiting a waveguide and corresponding to a defined image segment of the curved image field hits a well-defined corresponding grid element 21 of the focal plane array 20. For example, the upper left waveguide 111A corresponds to the upper left light processing element 21A as shown in FIG. 1. In other words, all the light entering the waveguide 111A at the first end is transmitted to the corresponding light processing element 21A.

The hollow waveguide array 110 can be mounted directly onto the focal plane array 20 or at a predetermined small distance or gap in front of the focal plane array 20. As an option, an isolation layer (not shown) separates the hollow waveguide array 110 and the focal plane array 20. Preferably, the distance between the focal plane array 20 and the hollow waveguide array 110 is chosen to be small enough so that all the light exiting from a waveguide 111 mostly hits the corresponding light processing element 21 of the focal plane array 20 and puts limitations on hitting any other light processing element 21. In this way, the hollow waveguide array 110 works as a focal plane (image) "pixilator" or sampler without or with very limited cross-sensitivity. The curved front surface of the hollow waveguide array 110 ensures that pixilation occurs in the (non-planar) focal plane of the optical device, e.g. the telescope. The hollow waveguide array 110 can also be described as a reflector grid placed in front of the focal plane array 20. In order to more clearly emphasize the principle of the invention, holding means used to mount and secure the focal plane adapter 110 in front of the focal plane array 20 are not shown.

By way of example, such a hollow waveguide array 110 can be manufactured with micromachining techniques, for example, using a deep reactive ion etching (DRIE) process on a silicon substrate which is then coated with a reflective coating to reduce the transmission losses of the waveguide since a waveguide array 110 according to the invention uses internal reflection to transmit the incident electromagnetic energy from one end of the waveguide array to the other end of the waveguide array. The eventual roughness induced by the DRIE process can be reduced with a wet or/and dry process prior to the reflective coating. Depending on the needs and the particular usage scenarios, additional reinforcement structures and alignment structures for simplifying bonding or packaging can be added to the hollow waveguide array structure. The hollow waveguides 111 as shown in FIG. 1 have a square cross-section.

Figure 2A:
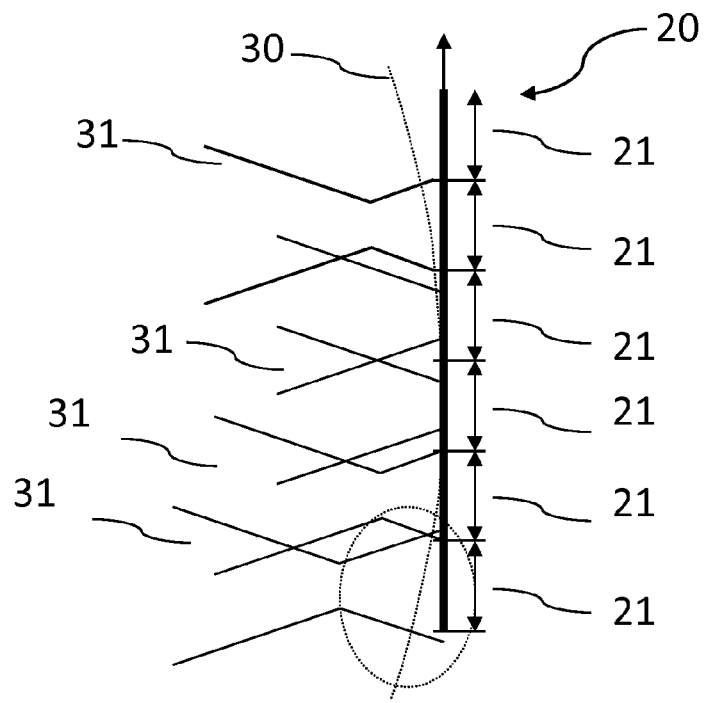
FIG. 2A and FIG. 2B illustrate the technical effect of a hollow waveguide array mounted in front of a planar focal plane array.
Figure 2B:
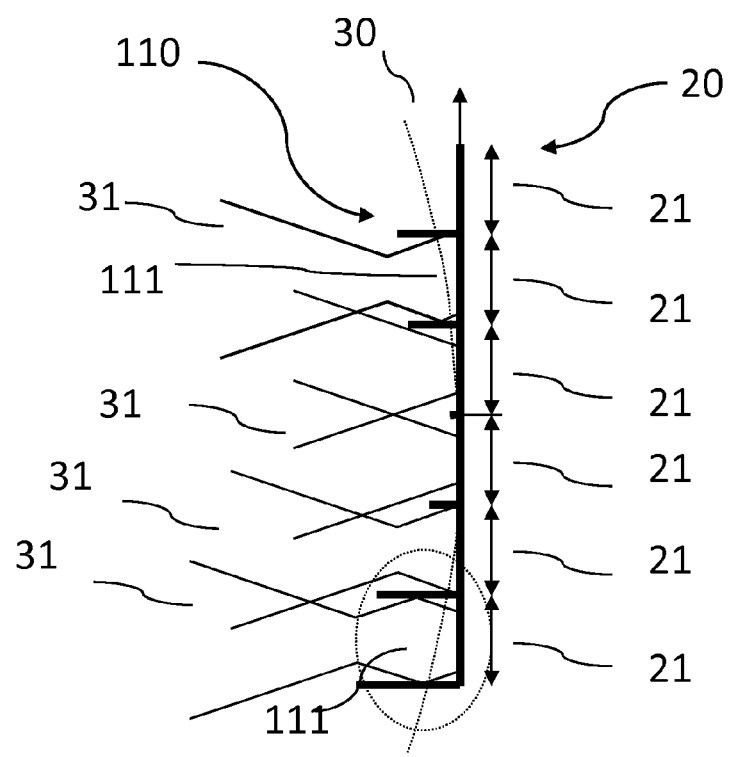

The effect of the hollow waveguide array is further explained schematically in FIGS. 2A and 2B.

FIG. 2A shows a schematic side view of a conventional flat photo detector array as a typical example of a planar FPA 20, e.g. an FPA of a telescope. FIG. 2B shows a side of view of the same photo detector array of FIG. 2A, however with an additional hollow waveguide array 110 mounted in front of the focal plane array 20. The FPA 20 comprises a number of light processing elements 21, e.g. the photo detector pixels.

The focal planes of most telescopes are not flat. Off-axis light usually focuses closer to the objective than does on-axis light. Thus, an object is imaged or projected on a curved surface in the image space rather than on a plane due to the optical field curvature. This optical field curvature is shown schematically using the dotted line 30 which illustrates the resulting curved image plane.

Since imaging detectors (CCDs, film, etc.) are normally flat, a curved focal plane cannot coincide exactly with the detector. In particular for large CCD chips and highly curved fields, it will be impossible to correctly image small, sharp stars across the entire field.

Due to the curved focal plane 30 of the image field, image degradation occurs in that not all light rays 31 hit the corresponding detector element. As illustrated schematically by the dotted circle in FIG. 2A around the lowest light processing element 21 of the focal plane array 20, the optical field of the lowest the light ray 31 enters not only the lowest light processing element 21, but also hits the adjacent light processing element 21 above due to the curved focal plane of the incident light. This distortion effect can be effectively prevented by placing the curved hollow waveguide array 110 in front of the focal plane array 20 as depicted in FIG. 2B which ensures that the lowest light ray 31 only enters the lowest waveguide 111 of the waveguide array 110 and therefore is guided only to the lowest light processing element 21 of the focal plane array 20.

As illustrated in FIG. 2B, the outer end portions of the wave guides 111 at the side of the incident light lie on a curved surface. The reflector grid or hollow waveguide array has a curved front surface that matches the contour of the optical field curvature of the image plane which allows for compensating for the degradation induced by the curvature difference between the focal plane and the flat focal plane array. Thus, in order to preserve the information being transmitted by the waveguides 111, the relative position of the first ends 12 of each waveguide 111 may be placed substantially in a curved focal plane corresponding to the curved focal plane 30 of the incident light so that he focal plane adapter spatially samples the optical field at its best local focus, i.e., at the curved image plane and without cross-sensitivity to reduce the effect of the non-planar wavefront which is a wider image point, or which is a local defocus that may degrade the image resolution on the FPA. The relative position of the second ends 13 of each waveguide 111 lie in a second planar plane parallel to the plane of the focal plane array 20, wherein each second end portion of a waveguide lies directly adjacent to a corresponding array element 21 of the FPA 20.

Figure 3:
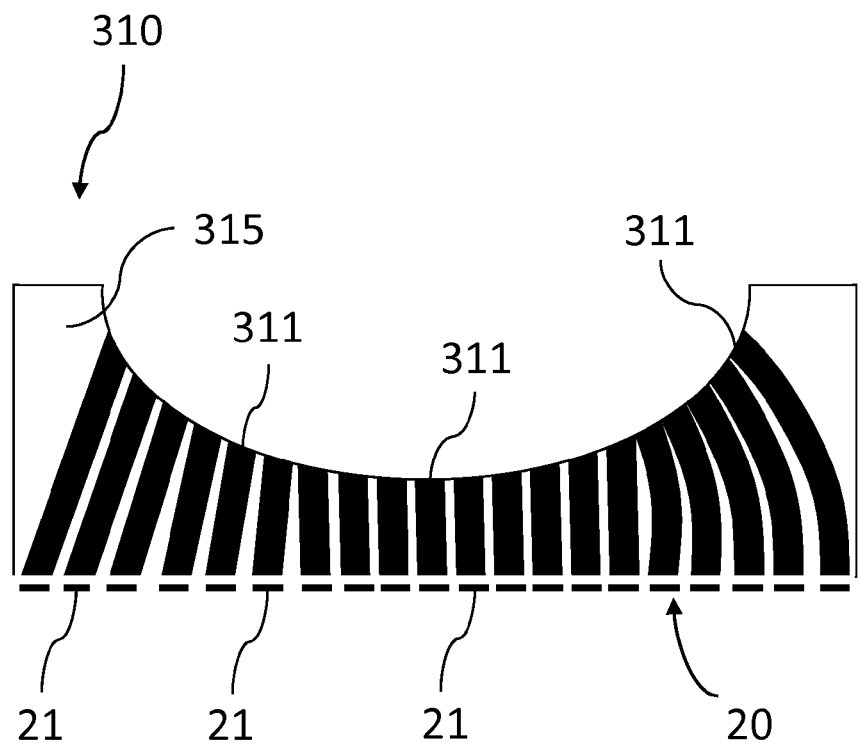
FIG. 3 illustrates a schematic sectional front view of an optical device according to an embodiment of the present invention.

FIG. 3 illustrates a schematic sectional front view of an optical device according to another embodiment of the present invention. According to this embodiment, the focal plane adapter 310 depicted in FIG. 3 comprises optical waveguides with a refractive index higher than 1 or higher than the surrounding media. The surrounding material is either air/vacuum or a transparent material with index of refraction lower than the refractive index of the waveguide.

The focal plane adapter 310 that is shown in a sectional view in FIG. 3 has a two-dimensional-curved front surface of elliptical paraboloid shape. The back side that is adjacent to the focal plane array 20 is planar. In contrast to the embodiment depicted in FIG. 1, the waveguides 311 are not hollow but have a refractive index higher than the surrounding material causing total internal reflection and thus guiding light with minimal transmission losses to the focal plane array 20. In particular, the optical waveguides 311 guide the light to dedicated sensor elements 21 of the focal plane array 20. Thus, the incident light exiting the optical waveguides 311 hits a predetermined area where the light is further processed. The length of the optical waveguides 311 is increasing from the inner to the outer portions of the front surface due to the concave curvature of the front surface. Whereas the waveguides in the center of the focal plane adapter 310 can be substantially straight, the waveguides 311 at the outer portions of the focal plane adapter 310 are either curved or inclined. The refractive index of the material 315 is higher than that of the optical waveguides 311.

Figure 4A:
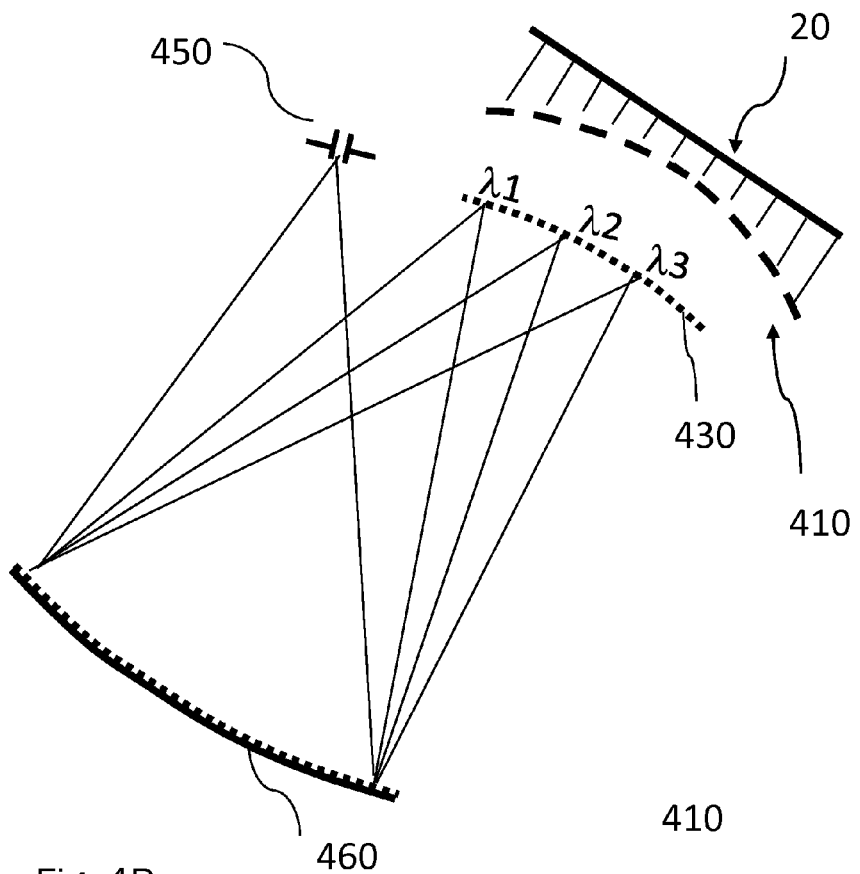
FIG. 4A and FIG. 4B illustrate schematically an optical device comprising a one-dimensional hollow waveguide array according to an embodiment of the present invention.
Figure 4B:
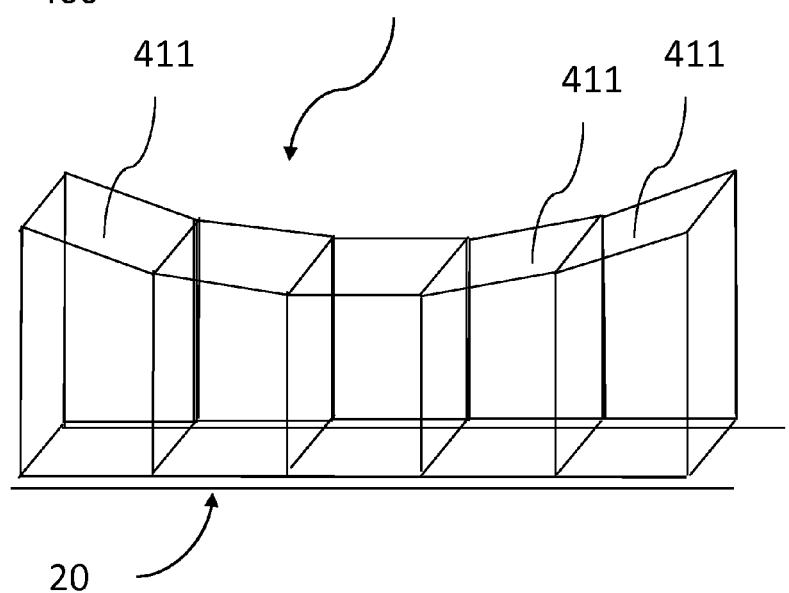

FIG. 4A illustrates another embodiment of the present invention, wherein the focal plane array 20 and the plurality of waveguides 11 are arranged in a one-dimensional array. FIG. 4A further illustrates schematically the use of a spectrometer device. The incident light enters the spectrometer slit 450 and hits a curved optical grating 460 which splits and diffracts light into several beams travelling in different directions depending on the wavelength of the light. This phenomenon is illustrated in FIG. 4A using three different wavelengths $\lambda 1$, $\lambda 2$, and $\lambda 3$ that are diffracted in different directions with a curved image field. The dotted line 430 is used to illustrate the diffracted curved image plane. An optical device comprising a hollow waveguide array 410 and a focal plane array 20, e.g. a photo detector array, is placed in the propagation direction of these diffracted beams of different wavelength. The optical device according to this embodiment, i.e., a one-dimensional array hollow waveguide array 410 is illustrated in more detail in FIG. 4B which shows the hollow waveguides 411 arranged in a one-dimensional array with a curved front surface at the side of the incident light. The curvature of the front surface is adapted to the curvature of the curved image plane 430. The planar back side of the focal plane array is arranged on top of a focal plane array 20 in the form of a photo detector array.

Features, components and specific details of the structure of the above-described embodiments may be exchanged or combined to form further embodiments optimized for the respective application. As far as those modifications are already apparent for an expert skilled in the art, this shall be disclosed implicitly by the above description without specifying explicitly every possible combination, for the sake of conciseness of the present description.

The invention claimed is:

1. An optical device for mapping a curved image field, the optical device comprising:
   a focal plane array having a plurality of light processing elements; and
   a focal plane adapter mounted in front of the focal plane array configured to transmit the curved image field to the light processing elements of the focal plane array,
   wherein the focal plane adapter comprises a plurality of waveguides,
   wherein first ends of the waveguides facing the curved image field are arranged on a curved surface, the curved surface being adapted to a profile of an optical field curvature of the curved image field so that the plurality of waveguides divide the curved image field along a curved focal plane of the image field into a plurality of image segments,
   wherein second ends of the waveguides are allocated to the light processing elements to map the plurality of image segments onto the allocated light processing elements, and
   wherein the focal plane adapter is a hollow waveguide array, wherein the curved surface is an elliptical paraboloid.

2. The optical device according to claim 1, wherein the plurality of waveguides have a depth in the range of hundreds of micrometers and comprise walls with a light reflective coating and a thickness of a few micrometers.

3. The optical device according to claim 1, wherein the focal plane array is a planar focal plane array.

4. The optical device according to claim 1, wherein the focal plane array comprises a photo-detector array, a micro-lens array, or a liquid crystal array.

5. The optical device according to claim 1, further comprising an isolation layer or gap arranged between the focal plane adapter and the focal plane array.

6. The optical device according to claim 1, wherein the light processing elements of the focal plane array and the plurality of waveguides of the focal plane adapter are arranged in a two-dimensional array.

7. The optical device according to claim 1, wherein the image processing elements of the focal plane array and the plurality of waveguides of the focal plane adapter are arranged in a one-dimensional array.

8. An imaging spectrometer comprising one or several optical devices according to claim 6.

9. A spectrometer comprising one or several optical devices according to claim 6.

10. A wide field camera comprising one or several optical devices according to claim 1.

11. A telescope comprising one or several optical devices according to claim 1.

* * * * *